Oct. 23, 1951 O. C. BOOHER ET AL 2,572,004

RECORD GUIDE MECHANISM

Filed March 26, 1949 3 Sheets-Sheet 1

INVENTORS
ORTIS C. BOOHER
JOSEPH M. BAXTER

BY Arthur A. Smith

ATTORNEY

Oct. 23, 1951 O. C. BOOHER ET AL 2,572,004

RECORD GUIDE MECHANISM

Filed March 26, 1949 3 Sheets-Sheet 2

INVENTORS
ORTIS C. BOOHER
JOSEPH M. BAXTER

BY Arthur A. Smith
ATTORNEY

Oct. 23, 1951 O. C. BOOHER ET AL 2,572,004

RECORD GUIDE MECHANISM

Filed March 26, 1949 3 Sheets-Sheet 3

INVENTORS
ORTIS C. BOOHER
JOSEPH M. BAXTER

BY Arthur A. Smith
ATTORNEY

Patented Oct. 23, 1951

2,572,004

UNITED STATES PATENT OFFICE 2,572,004

RECORD GUIDE MECHANISM

Ortis C. Booher, Huntington, and Joseph M. Baxter, Fort Wayne, Ind., assignors to Farnsworth Research Corporation, a corporation of Delaware Application March 26, 1949, Serial No. 83,626

3 Claims. (Cl. 274—10)

This invention relates to an automatic phonograph apparatus and is particularly directed to a record guide mechanism.

More particularly, this invention relates to a record guide mechanism which is useful in conjunction with the type of phonograph apparatus disclosed in Patent No. 2,311,596, issued on February 16, 1943 to J. H. Pressley and entitled "Automatic Record Changing Apparatus."

Briefly, the Pressley apparatus referred to consists of an automatic phonograph record-changing apparatus having a movable record-holding magazine including means for releasing a record therefrom. Cooperating with the magazine there is pivotally mounted a record carrier having formed thereon a pair of annular trays adapted, in one particular movement, to receive a record from the magazine and, in another particular movement, to place the record on the turntable for reproduction. The annular trays are of two different sizes; one is adapted to receive a large record and the other a small record.

During a change-cycle operation, when the carrier places the record on the turntable, the record engages the rotating turntable at an oblique angle for placement thereon. As the lower edge of the record engages the turntable, there is induced upon the record a slight lateral movement, caused by the frictional engagement of the record with the rotating turntable. The rim of each annular tray normally stops the lateral movement of the record.

However, it has been found that when the edge of a record is marred or chipped, the record in engaging the turntable is caused to move laterally an abnormal distance whereupon the record has a tendency to climb out of the tray to cause a faulty change-cycle operation. This occurs particularly with small records, such as the ten-inch size, for the reason that they are much lighter in weight than the large size record, such as the twelve-inch size.

Therefore, it is an object of this invention to provide a novel record guide mechanism.

In accordance with this invention, there is provided an automatic phonograph having a turntable and a record magazine. Associated with the magazine there is provided means comprising a movable carrier for transferring records from the magazine to the turntable. Cooperating with the record carrier there is provided record guide means movable to an operative position in response to the movement of said carrier for guiding the record over the turntable. Means are also provided for moving the guide means to its inoperative position when the carrier is moved a predetermined distance.

For a better understanding of the invention, together with other and further objects thereof, reference is made to the following description, taken in connection with the accompanying drawings and its scope will be pointed out in the appended claims.

Figure 1:
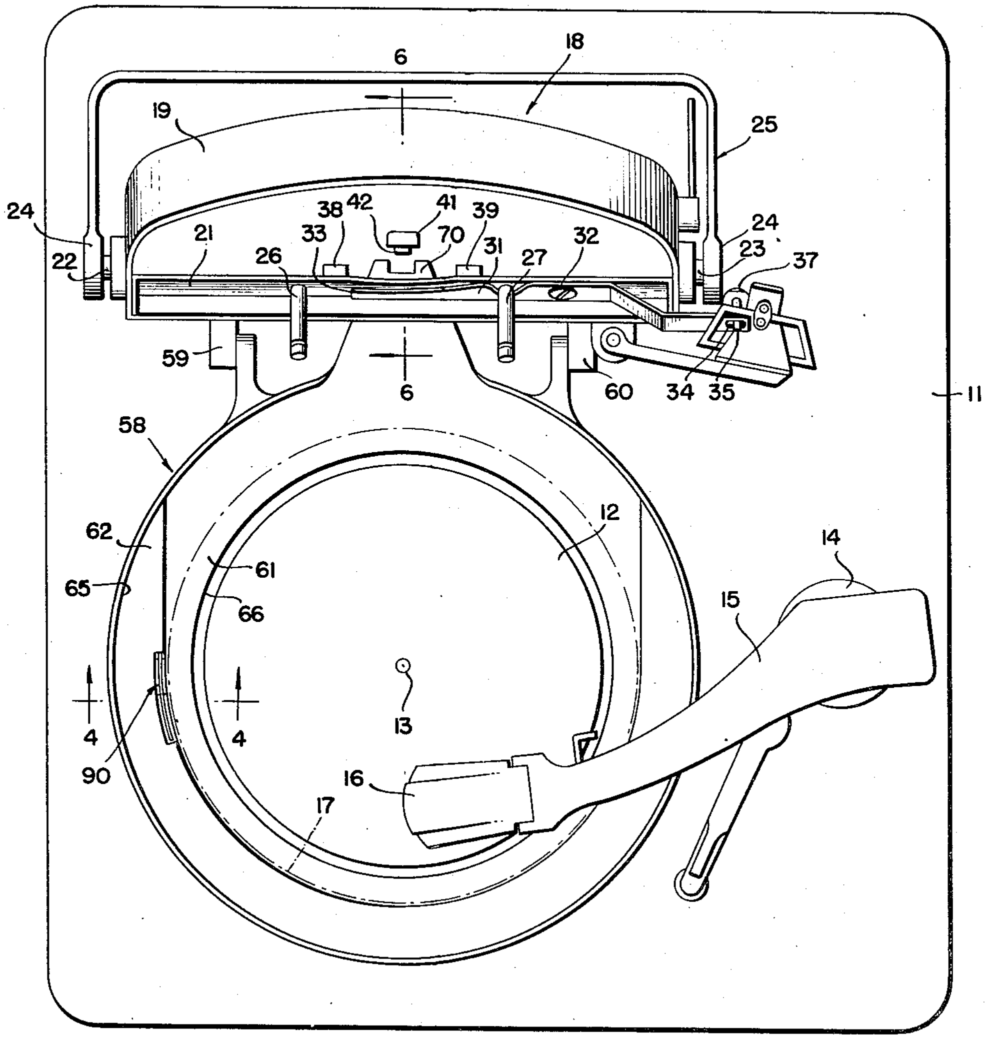
Fig. 1 is a top plan view of the phonograph apparatus.

Referring to the drawings, there is shown a phonograph apparatus having a base plate 11 upon which is horizontally mounted a turntable 12 having a record-centering pin 13. The turntable is driven by a suitable driving mechanism (not shown).

Adjacent the turntable there is pivotally mounted for horizontal and vertical movement on a standard 14 (Fig. 1), a tone arm 15 having at its outer end a pivotally mounted reproducer 16 adapted to track the record 17.

Associated with the turntable there is provided a movable record magazine 18 (Figs. 1 and 6), adapted to support a stack of intermized records 17 in a substantially vertical position. The magazine comprises a semi-annular member 19 having a back portion 20 and a lower cross member 21. The member 19 is provided with a pair of outwardly projecting shafts 22—23 which in turn are journaled at the upper end of a pair of vertical arms 24—24 of a yoke bracket 25 secured to the base plate.

Extending forwardly from the cross member 21 and equally spaced from the center thereof, is a pair of record-supporting pins 26—27 adapted to support a stack of records at their lower edges, while the upper edges thereof rest against an irregular stop member 29 (Fig. 6) formed on the back portion 20. On the back portion 20 there is also arranged a record guide member 30, for facilitating the movement of a record when the magazine is tilted.

For ejecting a record from the magazine, there is provided a mechanism comprising a knife lever 31 (Figs. 1 and 6) pivoted intermediate its ends, as at 32, to the cross member 21. The end 33 of the lever 31 is disposed between and below the record-supporting pins 26—27 and has the upper surface thereof inclined downwardly toward the cross member 21.

The opposite end of the lever 31 is provided with an elongated slot 34 in which is disposed a forwardly projecting end portion 35 of a downwardly extending rod 36 (Fig. 2) journaled in an upright standard 37 affixed to the upper surface of the base plate.

In operation, when the rod 36 is actuated in a downwardly direction, the end 33 of the knife lever 31 is pivoted in an upwardly direction (Fig. 6) into knifing engagement with the stack of records 17. Since the end 33 has an inclined surface, one record is elevated out of the stack and caused to slide over the cross member 21, to have its lower edge land on a pair of spaced cushion members 38—39 disposed on the base plate adjacent the lower edge of the member 19. Associated with the cushion members 38—39, there is arranged a vertical support 41 having a pad 42 against which the lower side of the record rests to prevent rearward movement thereof.

Means are provided for operating the rod 36 and the knifing lever 31. For this purpose there is arranged a master cam 45 (Fig. 2) mounted on a shaft 46 journaled in a bracket 47 depending from the base plate.

Arranged on the periphery of the master cam 45 is a cam surface 50 which, upon rotation of the master cam 45 in a clockwise direction, is adapted to engage a cam follower 51 to pivot a lever 52 in a clockwise direction. The lever 52 is mounted on a shaft 53 which in turn is journaled on a bracket 54 depending from the base plate. The opposite end of the lever 52 is pivotally connected, as at 56, to the rod 36. Thus, when the lever 52 is pivoted, in a clockwise direction, the rod 36 is moved in a downwardly direction to pivot the knife 31 into knifing engagement with a record in the magazine in the manner already described.

After a record has been ejected from the magazine and positioned on the cushion members 38—39, record transfer means are provided to place the record on the turntable for reproduction. The record transfer means comprises, a record carrier 58 pivotally mounted on a pair of upright bearing members 59—60 (Fig. 1) secured on the base plate. The carrier 58 consists of a pair of integral annular tray portions 61 and 62 which are adapted in one position to receive a record from the magazine and in another position to concentrically encircle the turntable and place the carried record thereon. The tray portion 61 is adapted to receive a small size record, such as a record of ten-inch diameter. The tray 62 is on a different plane and is adapted to hold a large size record, such as a record of the twelve-inch size. The walls 64 and 65 define the areas of the tray portions 61—62, respectively. The central opening of the tray 61, defined by the rim 66, permits the carrier 58 to be pivoted over and below the plane of the turntable.

Extending rearwardly from the carrier 58 into the area between the cushion members 38—39 (Figs. 1 and 2), is an integral projection 70. Formed on the underside of the projection 70 is a gear segment 71 meshing with a segment gear 72 affixed on shaft 53. Secured to the shaft 53 is a lever 73 pivotally connected, as at 74, to one end of an actuating arm 75. The opposite end of the arm 75 is slotted to receive the shaft 46. Intermediate the ends of the arm 75 is affixed a cam follower 77 adapted to ride within a cam groove 78 arranged on the master cam 45.

Figure 2:
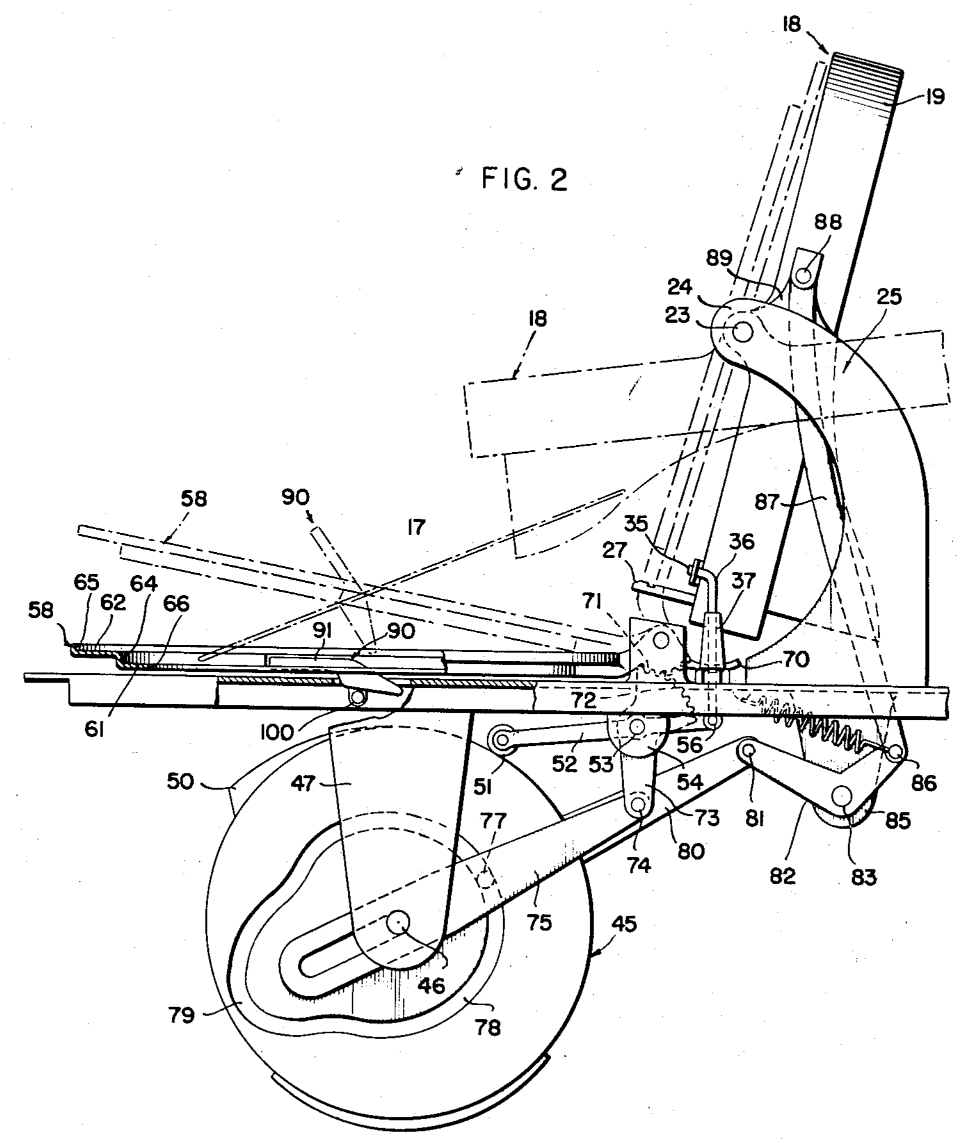
Fig. 2 is a side elevational view showing a partial assembly of the apparatus.

In operation, when the high point 79 of the cam groove 78 engages the cam follower 77, the actuating arm 75 is moved to the right (Fig. 2); as a result, the lever 73 is pivoted in a counterclockwise direction thereby rotating the shaft 53 therewith. Upon the rotation of the shaft 53, the segment gear 72 is rotated to cause the segment 71 to rotate in a clockwise direction to swing the carrier 58 upwardly through an arc from the full-line position to the dotted-line position, as shown in Fig. 2. When the carrier 58 is pivoted from its full-line position to the dotted-line position, it returns a reproduced record from the turntable to the magazine. When the carrier 58 is pivoted away from the magazine, the projection 70 thereof swings upwardly into engagement with the lower periphery of the record resting on the members 38—39 to elevate it for the subsequent operation.

As the projection 70 swings upwardly with the record, the magazine 18 is swung simultaneously on its bearings 22—23 through an arc from the full-line position to the dotted-line position, as shown in Fig. 2 of the drawings. For swinging the magazine, there is operatively connected to the master cam 45 a control mechanism (not shown) which is extensively disclosed in Patent No. 2,311,596 to which reference may be had for details thereof. This control mechanism, in part, is connected to one end of the lever 80 (Fig. 2), the opposite end thereof being pivotally connected, as at 81, to one arm of a bell crank 82, pivotally mounted, as at 83, to a depending bracket 85 affixed to the base plate. The other arm of the crank 82 is pivotally connected, as at 86, to one end of an upwardly extending bar 87. The opposite end of the bar 87 is pivotally connected, as at 88, to a bracket 89 affixed to the magazine. Upon movement of the lever 80 in a forwardly direction, the bell crank 82 connected thereto is pivoted in a clockwise direction to move the lever 87 in a downwardly direction whereupon the magazine is pivoted in a clockwise direction as shown in dotted lines (Fig. 2).

Figures 3, 5, 6:
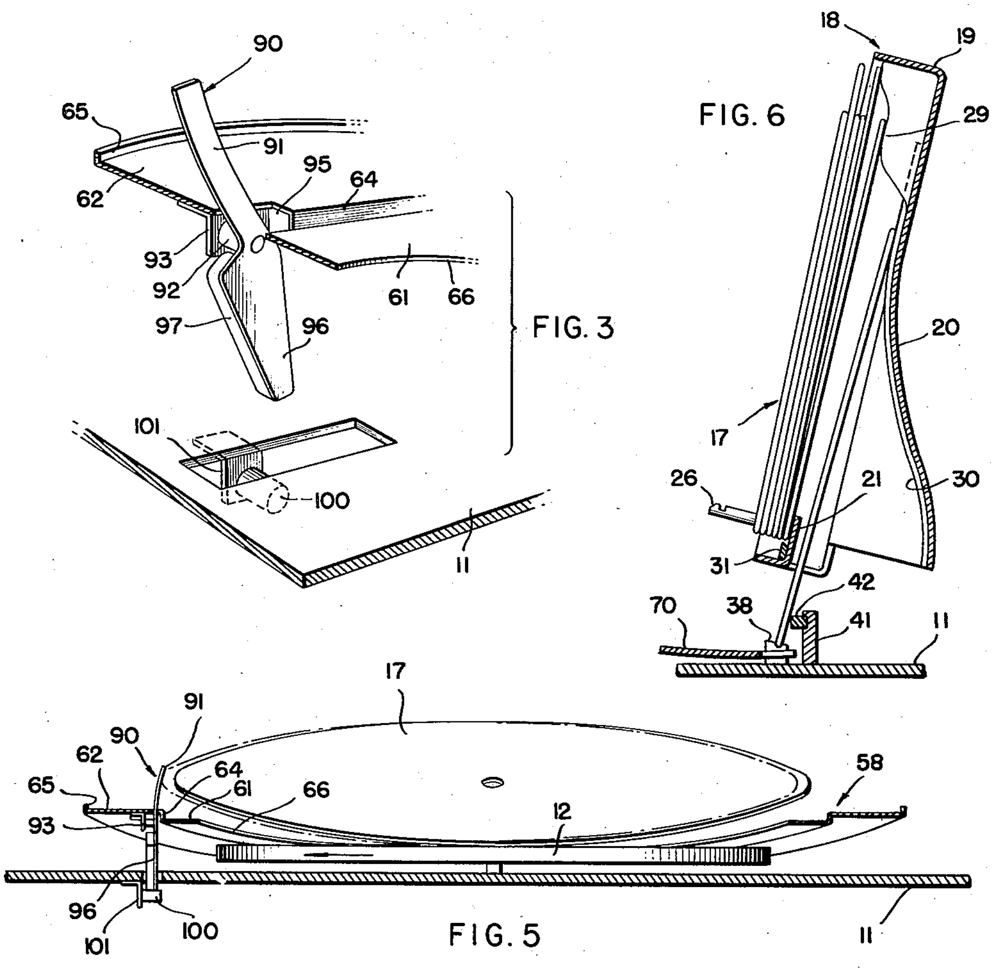
Fig. 3 is a perspective fragmentary view of the record guide mechanism.
Fig. 5 is a sectional view of the guide mechanism showing it in operative relation with the record.
Fig. 6 is a sectional view taken on line 6—6 of Fig. 1.

As the magazine is pivoted, the back portion 20 thereof engages the rear face of the record held by the projection 70 to move it within the rim 66 of the carrier 58 (Figs. 2 and 6). Simultaneously with the movement of the magazine, the carrier moves in a counterclockwise direction placing the record obliquely on the rotating turntable, the carrier coming to rest below the plane of the turntable. As explained heretofore, the annular tray portions 61 and 62 are adapted to receive small and large records respectively.

Normally, when records having a normal smooth edge surface come into frictional engagement with the rotating turntable, there is induced upon the record a relatively small lateral movement. The lateral movement of the records is stopped usually by the semi-annular wall portions of each tray. In practice, it has been found that there is a greater frictional engagement between the record and turntable when the edge of the record is chipped or marred. The result is that such records have a tendency to climb out of the tray portions of the carrier. This is particularly true of small records, since they are much lighter in weight than the large records.

Therefore, record guide means are provided to prevent a small record, particularly one having an abnormal edge surface, from climbing out of the tray 61. This means consists of record guide lever 90 having a finger 91 (Figs. 3 and 5). The lever 90 is pivoted intermediate its ends, as at 92, to a depending bracket 93 positioned beneath the carrier 58 adjacent the wall 64 of the tray 61. The finger 91 is curved to conform with the annular portion of the wall 64, and thereby effectively forms a movable wall section of the tray 61. The end 96 is weighted, as at 97, to pivot the finger 91 in an upwardly position above the plane of the tray 61. An elongated aperture 95 is arranged at the junction point of the wall 64 and the tray 62 to permit movement of the finger 91.

Figure 4:
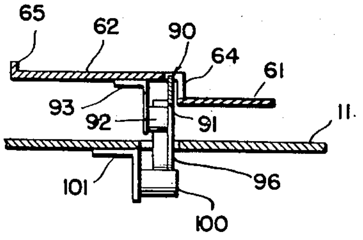
Fig. 4 is a sectional view taken on line 4—4 of Fig. 1.

Cooperating with the lever 90 there is arranged a roller 100 affixed to a depending bracket 101 located beneath the base plate. When the carrier is pivoted a predetermined distance the roller is engaged by the end 96 of the lever 90 whereupon the finger 91 thereof is pivoted into alignment with the annular wall portion 64 of the tray 61 (Figs. 2 and 4).

In operation (Figs. 2, 3, 5 and 6), as the carrier 58 is elevated to dispose a played record into the magazine, or is lowered to place a small record on the turntable, the finger 91 is automatically pivoted above the plane of the carrier by reason of the weighted end 96 thereof. Assuming that during the change-cycle operation a record having an abnormal edge is being placed on the turntable by the carrier, the record in engaging the rotating turntable has a tendency to move laterally, an abnormal distance. However, the abnormal lateral movement of the record is arrested by the finger 91 to confine the record within the tray 61, as clearly shown in Fig. 5. When the carrier 58 is lowered a predetermined distance, the weighted end 96 comes into engagement with the roller 100, whereupon the finger 91 is pivoted to its inoperative position with the record accurately positioned on the turntable.

In the event that a large record is being placed on the turntable by the carrier 58, the peripheral edge of the record engages the finger 91 to pivot it into alignment with the annular wall portion of wall 64. When the carrier has placed the record on the turntable, the roller 100 engages the lever 90 to hold it in its inoperative position (Figs. 2 and 4). Wall 65 of the carrier 58 confines the large record within the tray 62 for placement of the record onto the turntable. Due to the weight of a large record, even though the edge thereof is marred, no appreciable lateral movement is had when it engages the turntable.

It is apparent that the invention may be embodied in other specific forms without departing from the spirit or essential attributes thereof, and it is desired, therefore, that the embodiments disclosed herein be considered in all respects as illustrative, reference being had to the appended claims for a determination of the scope of the invention.

What is claimed is:

1. In combination with an automatic phonograph having a turntable, a record magazine adjacent said turntable adapted to support a stack of records, and means for transferring records from the magazine to the turntable comprising carrier in the form of a ring pivotally mounted relative to said turntable and magazine, said carrier having a planar record supporting surface disposed on one side of the pivotal point and means for defining the position of a record on said surface comprising an annular wall projecting upwardly from said surface, said record supporting surface being adapted in one position of said carrier to receive a record from said magazine and in another position to concentrically encircle the rotating turntable to place the carried record thereon in such a manner that the portion of the record remote from the carrier pivot initially contacts the rotating turntable whereby the record tends to climb said wall, means for preventing the record from climbing said wall comprising record guide member pivotally mounted in said carrier and adapted to project above the plane of the turntable from said surface and extending above said wall in its operative position when the carrier is in said other position to cooperate with said wall to prevent the record from climbing said wall, said guide being adapted to be retracted to an inoperative position, and cam means cooperating with said guide member for moving said guide member to its inoperative position upon a predetermined movement of said carrier.

2. In combination with an automatic phonograph having a base, a turntable mounted for rotation on said base, a record magazine adjacent said turntable adapted to support a stack of records, means for transferring records from the magazine to the turntable comprising carrier in the form of a ring pivotally mounted on said base, said carrier having a planar record supporting surface disposed on one side of the pivotal point and means for defining the position of a record on said surface comprising an annular wall projecting upwardly from said surface, said record supporting surface being adapted in one position of said carrier to receive a record from said magazine and in another position to concentrically encircle the rotating turntable to place the carried record thereon in such a manner that the portion of the record remote from the carrier pivot initially contacts the rotating turntable whereby the record tends to climb said wall and means cooperating with said wall for preventing the record from climbing said wall comprising a section of said wall pivotally mounted on said carrier and having an operative position forming an extension of said wall in a direction away from said surface, biasing means for normally maintaining said movable wall section in its operative position, said wall section being adapted to be retracted against said biasing means to an inoperative position, and means associated with said base plate adapted to engage said movable wall section to move said section to its retracted inoperative position upon the carrier attaining a position wherein the record supporting surface is below the plane of the turntable.

3. In combination with an automatic phonograph having a turntable, a record magazine adjacent said turntable adapted to support a stack of records and means for transferring records from the magazine to the turntable comprising a carrier in the form of a ring pivotally mounted with respect to said turntable and magazine, said carrier having a planar annular record supporting surface disposed on one side of the pivotal point and means for defining the position of a record on said surface comprising an annular wall projecting upwardly from said surface, said record supporting surface being adapted in one position of said carrier to receive a record from said magazine and in another position to concentrically encircle the rotating turntable to place the carried record thereon in such a manner that the portion of the record remote from the carrier pivot initially contacts the rotating turntable whereby the record tends to climb said wall, means for preventing the record from climbing said wall comprising a guide member pivotally mounted adjacent the peripheral edge of said annular surface about an axis radially disposed with respect to said surface, said guide member comprising a pivoted lever having one end thereof weighted to cause its opposite end to be pivoted to a position wherein said opposite end will normally project above said wall and a cam member affixed to said base plate for engaging the weighted end of said lever when said tray has placed the record on said turntable to pivot the unweighted end of said lever below said wall.

ORTIS C. BOOHER.
JOSEPH M. BAXTER.

REFERENCES CITED

The following references are of record in the file of this patent:

UNITED STATES PATENTS

| Number | Name | Date |
|---|---|---|
| 1,942,864 | La Rue | Jan. 9, 1934 |
| 2,354,899 | Wilber | Aug. 1, 1944 |